(12) United States Patent
Karst et al.

(10) Patent No.: US 8,668,981 B2
(45) Date of Patent: Mar. 11, 2014

(54) HIGH TEMPERATURE SHAPE MEMORY POLYMER VIA REACTIVE EXTRUSION

(75) Inventors: Greg Karst, Columbus, OH (US); Tat Tong, Bellbrook, OH (US)

(73) Assignee: Spirit AeroSystems, Inc., Wichita, KS (US)

( * ) Notice: Subject to any disclaimer, the term of this patent is extended or adjusted under 35 U.S.C. 154(b) by 31 days.

(21) Appl. No.: 13/293,940

(22) Filed: Nov. 10, 2011

(65) Prior Publication Data

US 2012/0123060 A1    May 17, 2012

Related U.S. Application Data

(60) Provisional application No. 61/412,630, filed on Nov. 11, 2010.

(51) Int. Cl.
*A61F 13/00* (2006.01)
*D01F 6/74* (2006.01)

(52) U.S. Cl.
USPC ........ 428/212; 525/326.7; 525/426; 525/436; 525/437; 525/451

(58) Field of Classification Search
USPC ........ 428/212; 525/326.7, 426, 436, 437, 451
See application file for complete search history.

(56) References Cited

U.S. PATENT DOCUMENTS

| | | | |
|---|---|---|---|
| 5,189,110 A | 2/1993 | Ikematu et al. | |
| 6,986,855 B1 | 1/2006 | Hood et al. | |
| 7,422,714 B1 | 9/2008 | Hood et al. | |
| 2008/0021166 A1* | 1/2008 | Tong et al. | 525/241 |
| 2010/0261802 A1 | 10/2010 | Eberstaller et al. | |
| 2011/0008596 A1 | 1/2011 | Kratz et al. | |

FOREIGN PATENT DOCUMENTS

EP    0 493 814 A2    7/1992

OTHER PUBLICATIONS

Hu, G.-H., Flat, J.-J., and Lambla, M., Reactive Modifiers for Polymers, S. Al-Malaika (ed.), Chapter 1, "Free-radical grafting of monomers onto polymers by reactive extrusion: principles and applications," Chapman & Hall, 1997, pp. 1-83.
Hu, J., Shape memory polymers and textiles, 2007, Chapter 1: Introduction, Woodhead Publishing, pp. 1-27.
Plastics extrusion, Wikipedia, http://en.wikipedia.org/wiki/Plastics_extrusion, 7 pages.
Mangalgiri, "Polymer-matrix Composites for High-temperature Applications," Defence Science Journal, 2005, vol. 55, No. 2, pp. 175-193.
Mondal et al., "Shape Memory Polyurethane for Smart Garment," RJTA, vol. 6, No. 2, pp. 75-83.
Behl et al., "Shape-memory polymers," materialstoday, 2007, vol. 10, No. 4, pp. 20-28.
Advanced Routes for Polymer Toughening, Polymer Science Library 10, Editor A.D. Jenkins, Chapter 3: Thermosetting Polyimides, Martuscelli, E., Musto, P., and Ragosta, G., 1996 Elsevier, pp. 121-154.
Chem424—Synthetic Polymer Chemistry, http://chem.chem.rochester.edu/~chem424/ultem.htm, 6 pages.
Shape memory polymer, Wikipedia, http://en.wikipedia.org/wiki/Shape_memory_polymer, 9 pages.
Amancio-Filho et al., "Thermal degradation of polyetherimide joined by friction riveting (FricRiveting). Part 1: Influence of rotation speed," 2008, Polymer Degradation and Stability, 93(8) 1529-1538.
Kuroda et al., "Degadation of Aromatic Polymers—II. The Crosslinking During Thermal and Thermo-Oxidative Degradation of a Polyimide," Eur. Polym. J., 1989, vol. 25, No. 6, 611-620.
Kuroda et al., "Degadation of Aromatic Polymers—III. Crosslinking and Chain Scission During Photodegradation of Polysulphones," Eur. Polym. J., 1989, vol. 25, No. 6, 621-627.
Kuroda et al., "Degradation of Aromatic Polymers—I. Rates of Crosslinking and Chain Scission During Thermal Degradation of Several Soluble Aromatic Polymers" Eur. Polym. J., 1989, vol. 25, No. 1, 1-7.
Abdul-Rasoul et al., "Photochemical and thermal cationic polymerizaations promoted by free radical initiators," Polymer, 1978, IPC Business Press, vol. 19, 1219-1222.
Hopewell et al., "Electron spin resonance study of the homopolymerization of aromatic bismaleimides," Polymer, 1998, Elsevier Science Ltd., vol. 39, No. 23, 5601-5607.
Ultem® 1000, GE Plastics—Polymer Imide, 2004, Product Description, 3 pages.
Extrusion, Bayer Materials Science, http://www.bayermaterialsciencenafta.com/processing/pcs/extrusion/profile.html, 2 pages.
Solvay Gives You More Plastics with More Performance than Any Other Company in the World, 1 page.
Polyetherimide, Wikipedia, http://en.wikipedia.org/wiki/Polyetherimide, 2 pages.

* cited by examiner

*Primary Examiner* — Ana Woodward
(74) *Attorney, Agent, or Firm* — Hovey Williams LLP

(57) ABSTRACT

Shape memory polymer compositions and methods of using those compositions to make products are provided. The compositions include a thermoplastic polymer and a high thermal stability free radical source, and they are extruded together to form the final shape memory product.

8 Claims, No Drawings

HIGH TEMPERATURE SHAPE MEMORY POLYMER VIA REACTIVE EXTRUSION

RELATED APPLICATIONS

The present application claims the priority benefit of U.S. Provisional Patent Application Ser. No. 61/412,630, filed Nov. 11, 2010, entitled, HIGH TEMPERATURE SHAPE MEMORY POLYMER, VIA REACTIVE EXTRUSION, incorporated by reference in its entirety herein.

BACKGROUND OF THE INVENTION

1. Field of the Invention

The present invention relates in general to new methods of producing or creating shape memory polymers (SMPs) that are high temperature compatible. The SMP is prepared by subjecting a thermoplastic resin to a high thermal stability radical source under extrusion conditions.

2. Description of the Prior Art

The first materials to be reported as exhibiting a shape memory effect were shape memory alloys (SMAs). Shape memory polymers (SMPs) typically exhibit a higher percentage of strain recovery and shape change than SMAs. Additionally, lower cost and better processability make SMPs viable for implementation into an array of applications.

SMPs are a unique class of polymers that soften and harden quickly and repetitively, on demand. The SMP's ability to transition from a soft to a hard state within a very narrow temperature span is a key physical property that allows processed SMP materials to maintain full structural rigidity up to a specifically designed activation, or glass transition temperature ($T_g$), and become softened with a slight elevation in temperature above $T_g$.

By conventional processing, i.e., extruding or injection molding, the polymer is formed into its initial, permanent shape. Afterwards, in a process called programming, the polymer is deformed and fixed into a temporary shape. Upon application of an external stimulus (i.e., heat, light), the polymer recovers its initial permanent shape. This cycle of programming and recovery can be repeated several times, with different temporary shapes in subsequent cycles.

Since the initial discovery of SMPs, many applications have been discovered for these unique materials that allow triggered responses. SMPs have been used in, for example, heat-expanding foam to seal windows, heat-shrinkable tapes, information storage that can allow thermally reversible recording, temperature sensors, smart clothing, and biomedical applications such as actuators, biodegradable sutures actuators, catheters, and smart stents.

Although a number of SMP systems have been developed, there is still a need for a high-temperature compatible SMP extrusion or injection molding processes. Most SMPs to date have a $T_g$ of less than 100° C. The currently available high temperature compatible SMP rely on long cure cycles and expensive starting materials. It is desirable to have a more economical and timely manner to manufacture SMPs that are stable at elevated temperatures, specifically for tooling purposes.

SUMMARY OF THE INVENTION

A method of forming a shape memory product is provided. The method comprises reacting a thermoplastic resin with a high thermal stability free radical source under sufficient temperature and pressure so as to cause the resin to crosslink and form the shape memory product.

The invention further provides a product comprising a crosslinked thermoplastic resin selected from the group consisting of polyetherimides and polyarylates, where the product is a shape memory polymer product.

DETAILED DESCRIPTION OF THE PREFERRED EMBODIMENTS

The present invention relates in general to new methods of forming shape memory polymers (SMPs) that are high temperature compatible. The present invention involves the compounding of a high temperature thermoplastic resin with a high-thermal stability free radical source under high temperature conditions to produce a shape memory polymer. Under extrusion conditions, the high thermal stability free radical source will generate free radicals. These free radicals will induce formation of radicals in the backbone of the high temperature thermoplastic starting material and induce crosslinking of the molecular chains. At optimum processing conditions and material ratios, the crosslinking density will be sufficient to produce shape memory properties in the extruded material. The high temperature stability of the thermoplastic starting material will be maintained in the final SMP. This approach to high temperature SMP production enables high volume output via conventional processing methods. No specialized secondary processing is necessary to achieve the SMP properties. This approach also utilizes lower cost starting materials than existing approaches. Certain aspects of the invention are described in U.S. Pat. Nos. 7,422,714 and 6,968,855, which are hereby incorporated by reference in their entireties into this application.

Thermoplastic Resin

In one embodiment of this invention, the thermoplastic starting material or resin is a polyetherimide resin (PEI). A preferred PEI comprises the repeat unit:

Scheme 1

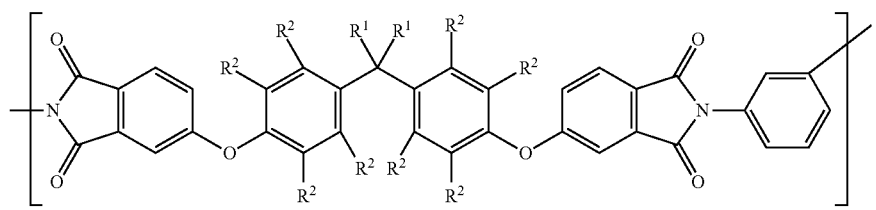

Each $R^1$ is individually selected from the group consisting of H, and $C_1$-$C_4$ alkyls, wherein the alkyl is optionally substituted with one or more halogens each individually selected from the group consisting of —Fl, —Cl and —Br. Each $R^2$ is individually selected from the group consisting of —H, $C_1$-$C_4$ alkyls, $C_1$-$C_4$ alkoxys, —Fl, and —Br, wherein at least one of $R^2$ is preferably —H.

In a preferred embodiment of the invention, $R^1$ is selected from the group consisting of $C_1$-$C_4$ alkyls and $R^2$ is —H, and in a particularly preferred embodiment, $R^1$ is —$CH_3$ and $R^2$ is —H. One commercially available polymer for use in the invention is Ultem® 1000.

In another embodiment of the invention, the thermoplastic starting material is a polyarylate (PAR) with the repeat unit shown in Scheme 2.

Scheme 2

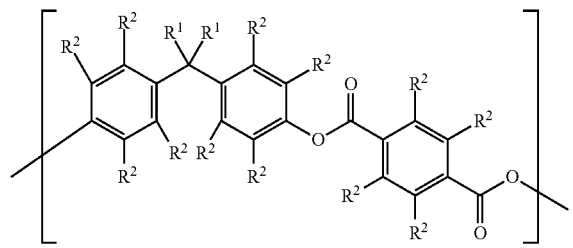

In Scheme 2, each $R^1$ is individually selected from the group consisting of —H, and $C_1$-$C_4$ alkyls, wherein the alkyl is optionally substituted with one or more halogens each individually selected from the group consisting of —Fl, —Cl, and —Br. Each $R^2$ is individually selected from the group consisting of —H, $C_1$-$C_4$ alkyls, $C_1$-$C_4$ alkoxys, —Cl, —Fl, and —Br, wherein at least one of $R^2$ is —H.

In a preferred embodiment of the invention, $R^1$ is selected from the group consisting of $C_1$-$C_4$ alkyls and $R^2$ is —H, and in a particularly preferred embodiment, $R^1$ is —$CH_3$ and $R^2$ is —H. One commercially available embodiment of the more preferred invention is U-100® (available from Unitika).

The thermoplastic resin is preferably utilized at levels of from about 50% by weight to about 99.995% by weight, preferably from about 75% by weight to about 99.99% by weight, and more preferably from about 95% by weight to about 99.9% by weight, based upon the total weight of all ingredients used to form the SMP product taken as 100% by weight.

High Thermal Stability Free Radical Source

The high thermal stability free radical source is one that is thermally stable. Preferably, the high thermal stability free radical source has a half-life of at least about 1 hour at about 80° C., preferably at least about 1 hour at about 120° C., and more preferably at least about 1 hour at about 150° C.

In one embodiment, a preferred high thermal stability free radical source for use in the present invention is a bismaleimide (BMI). Preferred bismaleimides include those selected from the group consisting of 1,1'-(methylenedi-4,1-phenylene)bismaleimide (MDP-BMI), 1,1'-(3,3'-dimethyl-1,1'-biphenyl-4,4'-diyl)bismaleimide, 1,4-(dimaleimido)butane, and N,N'-(1,3-phenylene)dimaleimide.

In another embodiment of the invention the high thermal stability free radical source is a peroxide. Preferred peroxides are dicumyl peroxide (DCP), di-t-butylperoxide (DTBP), t-butyl cumyl peroxide (BCP), di-t-amylperoxide (DTAP), bis(t-butylperoxyisopropyl)benzene, and benzoyl peroxide (BP).

In another embodiment of the invention, the high thermal stability free radical source is a carbon radical inducing agent as described in EP Patent Application Publication No. 0 493 814, which is hereby incorporated in its entity into this application. One type of carbon radical inducing agent (type I) is a combination of compounds ("Component A" and "Component B") that form charge-transfer complexes to yield radicals on both the unsaturated bonds. Examples of Component A are maleimide, N-substituted maleimides, bismaleimides, and α,β-unsaturated carboxylic acids and their anhydrides. Examples of Component B are 6-ethoxy-2,2,4-trimethyl-1,2-dihydroquinoline, poly(2,2,4-trimethyl-1,2-hydroquinoline), styrene, α-methylstyrene, trans-stilbene, vinylferrocene, 4-vinylpyridine, 2-isopropenylnaphthalene, N-vinylcarbazole. N-vinylindole, indole, benzofuran, furan, dihydrofuran, 3,3-dihydro-2-pyran, cyclic vinyl ethers such as 4H-chromene, furan derivatives such as furyl acetate, alkyl vinyl ethers such as n-octadecylvinyl ether and ethylvinyl ether, enol ethers or enol esters of ketones, esters, aldehydes, amides, or lactams such as ketene acetal, isopropenyl acetate, and 1-amino-1-methoxyethylene, allyl acetate, vinyl acetate, 1,2-dimethoxyethylene, p-dioxene, 2-chloroethylvinyl ether, 2-phenylvinylalkyl ethers, 2-phenylalkenyl ethers, heptafluoroisopropylalkenyl ethers, ethylvinyl sulfide, styrylalkenyl thioethers, p-oxadiene, cyclopentene, cyclohexene, divinyl ether, butadiene, isoprene, 1,3-pentadiene, 1,4-pentadiene, and dimethyldivinyl silane. Preferred combinations of Components A and B are: A—maleimides or unsaturated carboxylic acid anhydride, and B—dihydroquinoline derivatives such as 6-ethoxy-2,2,4-trimethyl-1,2-dihydroquinoline or poly(2,2,4-trimethyl-1,2-dihydroquinoline).

In another embodiment of the invention, the carbon radical inducing agent (Type I) is a single component. Preferred embodiments of this invention are 1,2-dihydrobenzene, 1,2-dihydronaphthalene, 9,10-dihydronaphthalene, octahydrophenanthrene, octahydroanthracene, tetraline, indene, tetrahydrofuran, 2,3-dihydrobenzofuran, and fluorene.

In another embodiment of the invention, the carbon radical inducing agent (Type II) is 1,1,2,2-tetramethyl-1,2-diphenylethane (dicumyl).

The high thermal stability free radical source is preferably utilized at levels of from about 0.005% by weight to about 5% by weight, preferably from about 0.01% by weight to about 2% by weight, and more preferably from about 0.1% by weight to about 0.5% by weight, based upon the total weight of all ingredients used to form the SMP product taken as 100% by weight.

Optional additives for use in the invention include those selected from the group consisting of dyes, pigments, organic fillers, inorganic fillers, softening agents (mineral oils and synthetic oils), flame retardants, crystallization accelerators, heat and light stabilizers, and other additives conventionally used for plastics. When optional ingredients are present, they are typically included at a level of from about 0.001% by weight to about 95% by weight, more preferably from about 0.001% by weight to about 50% by weight, and even more preferably from about 0.01% by weight to about 10% by weight, based upon the total weight of all ingredients used to form the SMP product taken as 100% by weight.

Product Formation

The SMPs are processed into a desired memorized shape by one of a number of known processes. Die casting, hot pressing, solvent casting, and extrusion are a few of the known means for processing SMP powder or resin into a memorized shape. Extrusion may be into the form of a sheet/film, a rod or tube, or profile extrusion (through a die).

Extrusion of a powdered SMP involves the following five steps: drying the material; heating; melting and pressuring the material; forming the melt; and cooling the formed material.

First, the high-temperature thermoplastic starting material (e.g., a polyetherimide, PEI) is dried by placing it in a vacuum or desiccant dryer for the purpose of removing moisture from the material. Heat and pressure are applied to form a hot melt. A high thermal stability free radical source (e.g., a bismaleimide, BMI) is added to the melt, preferably downstream from the extruder inlet. As soon as the high thermal stability free radical source is added, the crosslinking reaction process begins. It is important to achieve the correct crosslink density in the extruded part. This is achieved by balancing the reaction kinetics such that the material remains flowable within the barrel so the screw does not seize, but initiates so the reaction will continue after the desired profile has been achieved. This kinetic balance is achieved by adjusting the overall melt temperature and residence time of the high thermal stability free radical source.

The melt then flows to the die through which it is forced, yielding the desired shape (i.e., sheet, tube, or I-beam). The extruded SMP can be gradually cooled, if desired, for more control over the reaction kinetics and crosslink density, or it can be immediately quenched (e.g., with water) to prevent oxidation of the material. Following extrusion of the SMP part, a heat treatment may be required to relax any residual stresses present in the polymer network. These heat treatments are conducted at temperatures above the $T_g$ and below the degradation temperature.

The apparatus used for melt kneading and dynamic heat treatment are exemplified by known devices such as open-type mixing roll, closed Banbury mixer, kneader, single-screw extruder, vented screw extruder, and twin-screw extruder.

The preferred process is an extrusion process. In these instances, it is preferred that the extrusion process be carried out at temperatures of from about 275° C. to about 370° C., preferably from about 300° C. to about 350° C., and more preferably from about 310° C. to about 330° C. The preferred pressures are from about 500 psig to about 2,000 psig. The residence time within the extruder barrel is typically from about 10 seconds to about 180 seconds.

Regardless of the formation process, it is preferred that the above reactions take place in an environment that is substantially free (i.e., less than about 0.1% by weight and preferably about 0% by weight) of non-reactive solvents. As used herein, "non-reactive solvent" refers to one that does not react with the thermoplastic resin during the reaction process. These include typical solvents used during polymerization reactions such as acetone, alcohol, toluene, methyl ethyl ketone, acetic acid, and mixtures thereof.

The Tg of the inventive shape memory polymers (and resulting products) is advantageously at least about 150° C., preferably from about 170° C. to about 250° C., and even more preferably from about 190° C. to about 210° C. The elastic modulus at 25° C. is from about 2 GPa to about 5 GPa, preferably from about 3.5 GPa to about 4.5 GPa, and more preferably from about 3.8 GPa to about 4.2 GPa. Furthermore, the % elongation is from about 5% to about 150%, preferably from about 50% to about 150%, and more preferably from about 100% to about 150%.

EXAMPLES

The following examples set forth preferred methods in accordance with the invention. It is to be understood, however, that these examples are provided by way of illustration and nothing therein should be taken as a limitation upon the overall scope of the invention.

Example 1

Ultem® 1000 (GE Plastics) is dried using a vacuum or desiccant dryer. The material (feed rate of 100 g/min) is heated, melted, and pressurized in an extruder at a temperature of 310° C. Next, 1,1'(methylenedi-4,1-phenyl)bismaleimide (MDL-BMI, Aldrich) (feed rate of 2.6 g/min) is added into the melted thermoplastic downstream, prior to exiting through the die. The material begins to crosslink and immediately exits through the extrusion die and begins to cool as the reaction continues until the appropriate crosslink density is achieved.

Example 2

U-100® (available from Unitika) is dried using a vacuum or desiccant dryer. The material (feed rate of 100 g/min) is heated, melted, and pressurized in an extruder at a temperature of 310° C. Next, 1,1'(3,3'-dimethyl-1,1-biphenyl-4,4'-diyl)bismaleimide (available from Aldrich) (feed rate of 2.8 g/min) is added into the melted thermoplastic downstream, prior to exiting through the die. The material begins to crosslink and immediately exits through the extrusion die and begins to cool as the reaction continues until the appropriate crosslink density is achieved.

Example 3

Ultem® 1000 is dried using a vacuum or desiccant dryer. The material (feed rate of 100 g/min) is heated, melted, and pressurized in an extruder at a temperature of 310° C. Next, dicumyl peroxide (DCP, available from Aldrich) (feed rate of 0.2 g/min) is added into the melted thermoplastic downstream, prior to exiting through the die. The material begins to crosslink and immediately exits through the extrusion die and begins to cool as the reaction continues until the appropriate crosslink density is achieved.

Example 4

Ultem® 1000 is dried using a vacuum or desiccant dryer. The material (feed rate of 100 g/min) is heated, melted, and pressurized in an extruder at a temperature of 310° C. Next, 6-ethoxy-2,2,4-trimethyl-1,2-dihydroquinoline (available from TCI America) (feed rate of 1 g/min) and N-methylmaleimide (available from TCI America) (feed rate of 1 g/min) are added into the melted thermoplastic downstream, prior to exiting through the die. The material begins to crosslink and immediately exits through the extrusion die and begins to cool as the reaction continues until the appropriate crosslink density is achieved.

Example 5

U-100® is dried using a vacuum or desiccant dryer. The material (feed rate of 100 g/min) is heated, melted, and pressurized in an extruder at a temperature of 310° C. Next, 1,1,2,2-tetramethyl-1,2-diphenylethane (available from Wuxi Zhufeng Fine Chemicals) (feed rate of 1.7 g/min) is added into the melted thermoplastic downstream, prior to exiting through the die. The material begins to crosslink and immediately exits through the extrusion die and begins to cool as the reaction continues until the appropriate crosslink density is achieved.

We claim:

1. A method of forming a shape memory product, said method comprising reacting a thermoplastic resin with a high thermal stability free radical source under sufficient temperature and pressure so as to cause said resin to crosslink and form the shape memory product, wherein said thermoplastic resin is selected from the group consisting of polyetherimides and polyarylates.

2. The method of claim 1, wherein said thermoplastic resin is present during the reacting at levels of from about 50% by weight to about 99.995% by weight, based upon the total weight of all ingredients used to form the product taken as 100% by weight.

3. The method of claim 1, wherein said high thermal stability free radical source has a half-life of at least about 1 hour at about 80° C.

4. The method of claim 1, wherein said high thermal stability free radical source is present during the reacting at levels of from about 0.005% by weight to about 5% by weight, based upon the total weight of all ingredients used to form the product taken as 100% by weight.

5. The method of claim 1, wherein said high thermal stability free radical source is selected from the group consisting of bismaleimides and peroxides.

6. The method of claim 1, wherein said reacting comprises reacting the thermoplastic resin with a high thermal stability free radical source selected from the group consisting of bismaleimides and peroxides.

7. The method of claim 1, wherein said reacting comprises extruding said thermoplastic resin with said high thermal stability free radical source.

8. A product comprising a crosslinked thermoplastic resin selected from the group consisting of polyetherimides and polyarylates, said product being a shape memory polymer product formed by coextruding said thermoplastic resin with a high thermal stability free radical source.

* * * * *